United States Patent
Shibata et al.

(10) Patent No.: US 10,661,740 B2
(45) Date of Patent: May 26, 2020

(54) BUMPER REINFORCEMENT AND METHOD OF MANUFACTURING BUMPER REINFORCEMENT

(71) Applicants: AISIN SEIKI KABUSHIKI KAISHA, Kariya-shi, Aichi-ken (JP); AISIN KEIKINZOKU KABUSHIKI KAISHA, Imizu-shi, Toyama-ken (JP); TOYOTA JIDOSHA KABUSHIKI KAISHA, Toyota-shi, Aichi-ken (JP)

(72) Inventors: Shunji Shibata, Nagoya (JP); Kiyoichi Kita, Okazaki (JP); Jun Shobo, Anjo (JP); Kyosuke Matsui, Anjo (JP); Tamaki Obayashi, Toyama (JP); Yuta Takanami, Imizu (JP); Hirofumi Shibata, Kariya (JP); Koji Saeki, Okazaki (JP)

(73) Assignees: Aisin Seiki Kabushiki Kaisha, Kariya-shi, Aichi-ken (JP); Aisin Keikinzoku Kabushiki Kaisha, Imizu-shi, Toyama-ken (JP); Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 45 days.

(21) Appl. No.: 16/013,061

(22) Filed: Jun. 20, 2018

(65) Prior Publication Data
US 2018/0370469 A1 Dec. 27, 2018

(30) Foreign Application Priority Data
Jun. 21, 2017 (JP) ................. 2017-121083

(51) Int. Cl.
*B60R 19/18* (2006.01)
*B21D 53/88* (2006.01)
*B60R 19/02* (2006.01)

(52) U.S. Cl.
CPC ............ *B60R 19/18* (2013.01); *B21D 53/88* (2013.01); *B60R 19/023* (2013.01)

(58) Field of Classification Search
CPC . B60R 19/18; B60R 19/023; B60R 2019/182; B60R 19/04; B21D 53/88
(Continued)

(56) References Cited

U.S. PATENT DOCUMENTS 4,714,287 A * 12/1987 Merkle ............ B60R 19/18
293/102
5,306,058 A * 4/1994 Sturrus ............ B60R 19/03
138/DIG. 11

(Continued)

FOREIGN PATENT DOCUMENTS

| JP | 08-99592 A | 4/1996 |
| JP | 2000-335333 A | 12/2000 |

(Continued)

OTHER PUBLICATIONS

Japanese Office Action issued in JP2017-121083 dated Mar. 20, 2019.

*Primary Examiner* — Jason S Morrow
*Assistant Examiner* — E Turner Hicks
(74) *Attorney, Agent, or Firm* — Finnegan, Henderson, Farabow, Garrett & Dunner, LLP (57) ABSTRACT

A bumper reinforcement includes a front wall, a rear wall, and a connection wall. Intermediate portions, in an extending direction, of the front wall and the rear wall are parallel to each other. An end portion, in the extending direction, of the front wall is bent toward the rear wall when viewed from the intermediate portion of the front wall. An end portion, in the extending direction, of the connection wall includes a front part and a rear part, and each of the front and rear parts extends from an inside to an outside in the vehicle width direction. A distance between a front end of the rear part and (Continued)

the rear wall gradually decreases in a direction from a base end of the rear part toward a distal end thereof. The front part is provided so as to extend along the front end of the rear part.

4 Claims, 12 Drawing Sheets

(58) Field of Classification Search
USPC .......................................... 293/122, 154, 155
See application file for complete search history.

(56) References Cited

U.S. PATENT DOCUMENTS

| | | | | |
|---|---|---|---|---|
| 5,603,541 | A * | 2/1997 | Wada | B60R 19/18 228/173.4 |
| 6,435,579 | B1 * | 8/2002 | Glance | B60R 19/18 293/102 |
| 6,764,119 | B2 * | 7/2004 | Bladow | B60R 19/18 293/102 |
| 7,108,303 | B2 * | 9/2006 | Bladow | B21D 53/88 293/102 |
| 9,371,047 | B2 | 6/2016 | Hashimoto et al. | |
| 9,399,437 | B2 | 7/2016 | Hashimoto et al. | |
| 2012/0025545 | A1 * | 2/2012 | Haneda | B60R 19/18 293/102 |

FOREIGN PATENT DOCUMENTS

| | | |
|---|---|---|
| JP | 2015-51754 | 3/2015 |
| JP | 2015-58759 | 3/2015 |
| JP | 2015-168299 | 9/2015 |
| JP | 5968285 | 8/2016 |
| JP | 6008811 | 10/2016 |

* cited by examiner

BUMPER REINFORCEMENT AND METHOD OF MANUFACTURING BUMPER REINFORCEMENT

INCORPORATION BY REFERENCE

The disclosure of Japanese Patent Application No. 2017-121083 filed on Jun. 21, 2017 including the specification, drawings and abstract is incorporated herein by reference in its entirety.

BACKGROUND

1. Technical Field

The disclosure relates to a bumper reinforcement for a vehicle and a method of manufacturing the same.

2. Description of Related Art

As described in Japanese Unexamined Patent Application Publication No. 2015-58759 (JP 2015-58759 A), a bumper reinforcement provided in a front end portion of a vehicle has been known. The bumper reinforcement has a rectangular tubular shape extending in a vehicle width direction. That is, the bumper reinforcement is a tubular body surrounded by a front wall, a rear wall, an upper wall, and a lower wall. Note that a rib parallel to the upper wall and the lower wall is provided inside the bumper reinforcement. Further, the length, in a width direction (a direction perpendicular to the front wall or the rear wall), of an end portion of the bumper reinforcement in its extending direction is set to be smaller than the length, in the width direction, of an intermediate portion of the bumper reinforcement in the extending direction.

The bumper reinforcement is manufactured as follows. First, an aluminum alloy material is extruded so that a rectangular tubular intermediate formed body extending linearly is formed (a forming step). The extrusion direction of the aluminum alloy material corresponds to the vehicle width direction. A sectional shape of the intermediate formed body, which is perpendicular to its extending direction, is the same as a sectional shape of an intermediate portion, in the extending direction, of a bumper reinforcement as a finished product. That is, the intermediate formed body includes walls corresponding to walls of the bumper reinforcement. Then, a rear part of an end portion of the intermediate formed body is cut (a trimming step). Then, the end portion of the intermediate formed body is heated (a heating step). Then, a front part (a front wall) of the end portion of the intermediate formed body is pressed rearward (a crushing step). Thus, the end portion of the intermediate formed body is crushed. Thus, a bumper reinforcement configured such that the length, in the width direction, of the end portion is smaller than the length, in the width direction, of the intermediate portion is manufactured.

Further, there has been known a bumper reinforcement manufactured as follows. First, an intermediate formed body is formed similarly to JP 2015-58759 A (a forming step). Then, a front corner of an end portion of the intermediate formed body is cut obliquely (a trimming step). Thus, an inclined surface inclined relative to a front surface of an intermediate portion of the intermediate formed body is formed in the end portion of the intermediate formed body. Then, a flat plate-shaped cover member is attached to the inclined surface (an attachment step).

SUMMARY

In the method of manufacturing the bumper reinforcement in JP 2015-58759 A, in the crushing step, intermediate portions, in the width direction, of an upper wall, a lower wall, and a rib in the end portion of the intermediate formed body in the extending direction are folded (buckled). Thus, the end portion of the intermediate formed body is deformed to a relatively large extent. In JP 2015-58759 A, the end portion of the intermediate formed body is softened by heating in the heating step. Thus, even when the end portion of the intermediate formed body is deformed to a relatively large extent in the crushing step subsequent to the heating step, occurrence of cracks in the walls (particularly, the upper wall, the lower wall, and the rib to be buckled) of the end portion of the intermediate formed body is reduced. In JP 2015-58759 A, the heating step is necessary, and therefore, a manufacturing process for the bumper reinforcement is complicated and the manufacturing cost thereof is high.

Further, in the case of the bumper reinforcement manufactured such that the cover member is attached, the trimming step and the step of attaching the cover member are necessary. Accordingly, a manufacturing process for the bumper reinforcement is complicated and the manufacture cost thereof is high. Also, it is necessary to manufacture the cover member separately from the intermediate formed body. Thus, the number of components is large and the component cost is high, as compared to the bumper reinforcement in JP 2015-58759 A.

The disclosure provides a bumper reinforcement that can be manufactured easily at low cost, and a method of manufacturing the same.

A first aspect of the disclosure relates to a bumper reinforcement including a front wall provided as a band-shaped wall so as to extend in a vehicle width direction in a front end portion of a vehicle, the front wall having a wall surface facing forward; a rear wall provided as a band-shaped wall so as to extend in the vehicle width direction behind the front wall, the rear wall having a wall surface facing rearward; and a connection wall provided as a band-shaped wall so as to extend in the vehicle width direction between the front wall and the rear wall, the connection wall having a wall surface facing upward or downward, and the connection wall being configured to connect the front wall to the rear wall. In the bumper reinforcement, the front wall, the rear wall, and the connection wall are formed integrally. Intermediate portions, in an extending direction, of the front wall and the rear wall are parallel to each other. An end portion, in the extending direction, of the front wall is bent toward the rear wall when the end portion is viewed from the intermediate portion of the front wall. An end portion, in the extending direction, of the connection wall includes a front part and a rear part, and each of the front part and the rear part extends from an inside to an outside in the vehicle width direction. A distance between a front end of the rear part and the rear wall gradually decreases in a direction from a base end of the rear part toward a distal end of the rear part. The front part is provided so as to extend along the front end of the rear part. A "distal end" according to the above-described aspect of the disclosure indicates an end of the bumper reinforcement in the extending direction (that is, the right end or the left end of the bumper reinforcement in the vehicle width direction). Further, a "base end" according to the above-described aspect of the disclosure indicates an end opposite to the distal end and an end provided near a boundary between the end portion and the intermediate portion in the bumper reinforcement in the extending direction.

In the above-described aspect, at least a part of the front part and at least a part of the rear part may contact each other.

In the above-described aspect, in base ends of the front part and the rear part, a gap may be provided between the front part and the rear part; and the part of the front part and the part of the rear part may be in surface contact with each other, the part of the front part and the part of the rear part being located in an area from the gap to distal ends of the front part and the rear part.

In the above-described aspect, at least a part of the front part and at least a part of the rear part may be welded.

A second aspect of the disclosure relates to a method of manufacturing a bumper reinforcement. The method includes integrally forming an intermediate formed body such that a sectional shape perpendicular to an extending direction of the intermediate formed body is uniform from a first end to a second end in the extending direction, wherein the intermediate formed body includes a front wall provided as a band-shaped wall so as to extend in a vehicle width direction in a front end portion of a vehicle, the front wall having a wall surface facing forward, a rear wall provided as a band-shaped wall so as to extend in the vehicle width direction behind the front wall, the rear wall having a wall surface facing rearward, and a connection wall provided as a band-shaped wall so as to extend in the vehicle width direction between the front wall and the rear wall, the connection wall having a wall surface facing upward or downward, and the connection wall being configured to connect the front wall to the rear wall; forming a cut portion such that the cut portion extends from a distal end surface of an end portion, in the extending direction, of the connection wall toward a base end of the end portion, and a distance between the rear wall and a first part of an inner peripheral part of the cut portion increases in a direction from the distal end surface of the end portion toward the base end, the first part of the inner peripheral part being located on a side of the rear wall; and bending a part of the end portion toward the rear wall, the part of the end portion being located in front of the cut portion.

In the above-described aspect, a second part of the inner peripheral part of the cut portion may be parallel to the front wall, the second part being located on a side of the front wall; and the first part of the inner peripheral part of the cut portion may be inclined relative to the rear wall, the first part being located on the side of the rear wall.

As described above, the bumper reinforcement according to the above-described aspect of the disclosure is manufactured as follows. The intermediate formed body is manufactured, the cut portion is formed in the end portion of the intermediate formed body, and the part located in front of the cut portion is bent toward the rear wall. That is, unlike JP 2015-58759 A, the connection wall is not folded (not buckled). Accordingly, although the end portion is not softened by heating before the part located in front of the cut portion is bent, the part located in front of the cut portion can be relatively easily bent. That is, according to the above-described aspect of the disclosure, the heating step performed in JP 2015-58759 A is not required. Further, it is possible to reduce the number of components in comparison with a bumper reinforcement manufactured by attaching a cover member to an intermediate formed body. Further, a step of attaching the cover member is not required. Thus, in the above-described aspect of the disclosure, the manufacturing process is simplified and the component cost can be reduced. Accordingly, the bumper reinforcement can be provided at low cost.

Further, in general, each end of the bumper reinforcement in the vehicle width direction are fastened to a frame member (for example, a side member) of the vehicle. At this time, a tool and a fastening member (a bolt, a nut, and the like) are inserted into the bumper reinforcement via an operation hole provided in any of the walls of the bumper reinforcement, and the bumper reinforcement is fastened to the frame member with the use of the tool and the fastening member. That is, the rear wall of the bumper reinforcement and the frame member are fastened by the fastening member inserted in the bumper reinforcement. In JP 2015-58759 A, as described above, the upper wall, the lower wall, and the rib in the end portion of the bumper reinforcement are folded (buckled). Accordingly, even if a tool and a fastening member for fixing the bumper reinforcement to a vehicle body are inserted into the end portion of the bumper reinforcement, folded parts of the upper wall, the lower wall, and the rib serve as obstacles, and thus, it is difficult to perform an operation of fastening the bumper reinforcement to the frame member. In contrast, in the bumper reinforcement of the disclosure, the connection wall is not folded (not buckled), and thus, it is possible to easily fix the bumper reinforcement to the frame member.

Further, in the above-described aspect of the disclosure, a part of the cut portion may be provided so as to extend in parallel to the extending direction of the end portion, the part of the cut portion being located at the base end of the end portion.

Figure 11:
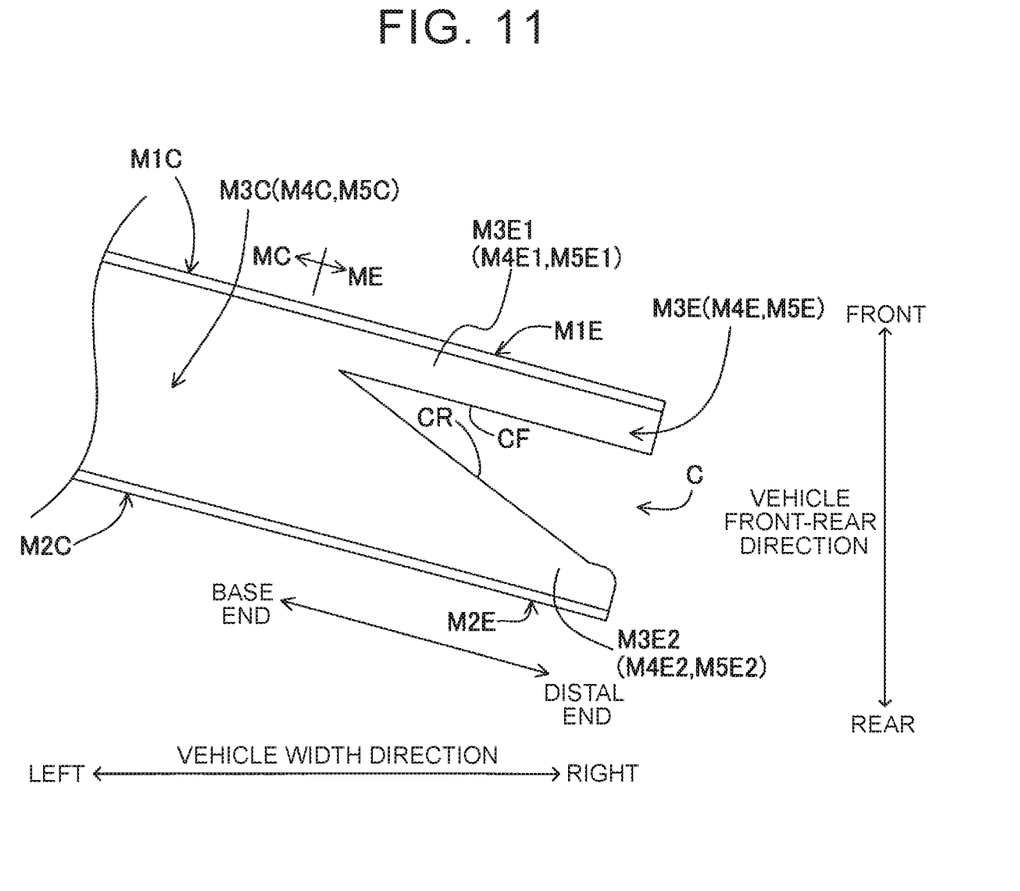
FIG. 11 is a plan view of an end portion of an intermediate formed body according to a modified example of the disclosure.

In general, when a metal material is bent, it is difficult to set a curvature radius of a bent portion to "0." In the above-described aspect of the disclosure, a part (particularly, its base end) located in front of the cut portion of the intermediate formed body is bent such that the bent part is curved. As illustrated in FIG. 11, a front side part of the inner peripheral part of the cut portion may obliquely intersect with a rear side part of the inner peripheral part of the cut portion, the front side part being located on the side of the front wall, and the rear side part being located on the side of the rear wall. In this case, it is difficult to bring the front side part and the rear side part into surface contact with each other because the bent part is curved. In the above-described aspect of the disclosure, a part of the cut portion is provided so as to extend in parallel to the extending direction of the end portion, the part of the cut portion being located at the base end of the end portion. Since the part of the end portion, which is bent, is located in front of the part of the cut portion, which extends in parallel to the extending direction of the end portion, the second part and the first part that extend linearly are easily brought into surface contact with each other.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
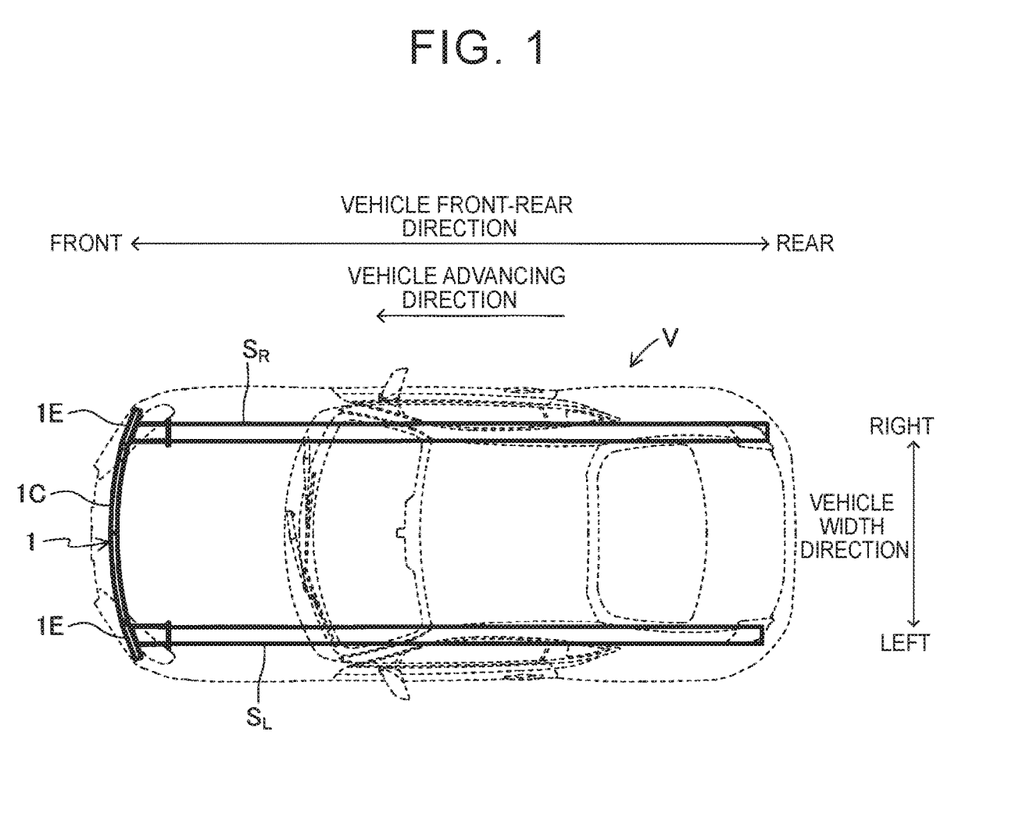
FIG. 1 is a plan view of a vehicle to which a bumper reinforcement according to an embodiment of the disclosure is applied.

A bumper reinforcement 1 according to an embodiment of the disclosure is described. First, a structure of a vehicle V to which the bumper reinforcement 1 is applied is described. As illustrated in FIG. 1, the vehicle V includes a pair of right and left side members $S_R$, $S_L$, and the bumper reinforcement 1.

The side members $S_R$, $S_L$ are disposed at an interval in a vehicle width direction. Each of the side members $S_R$, $S_L$ extends in a vehicle front-rear direction. Plate-shaped flange portions are respectively provided in front end portions of the side members $S_R$, $S_L$. The bumper reinforcement 1 is fastened to the flange portions.

Figure 2:
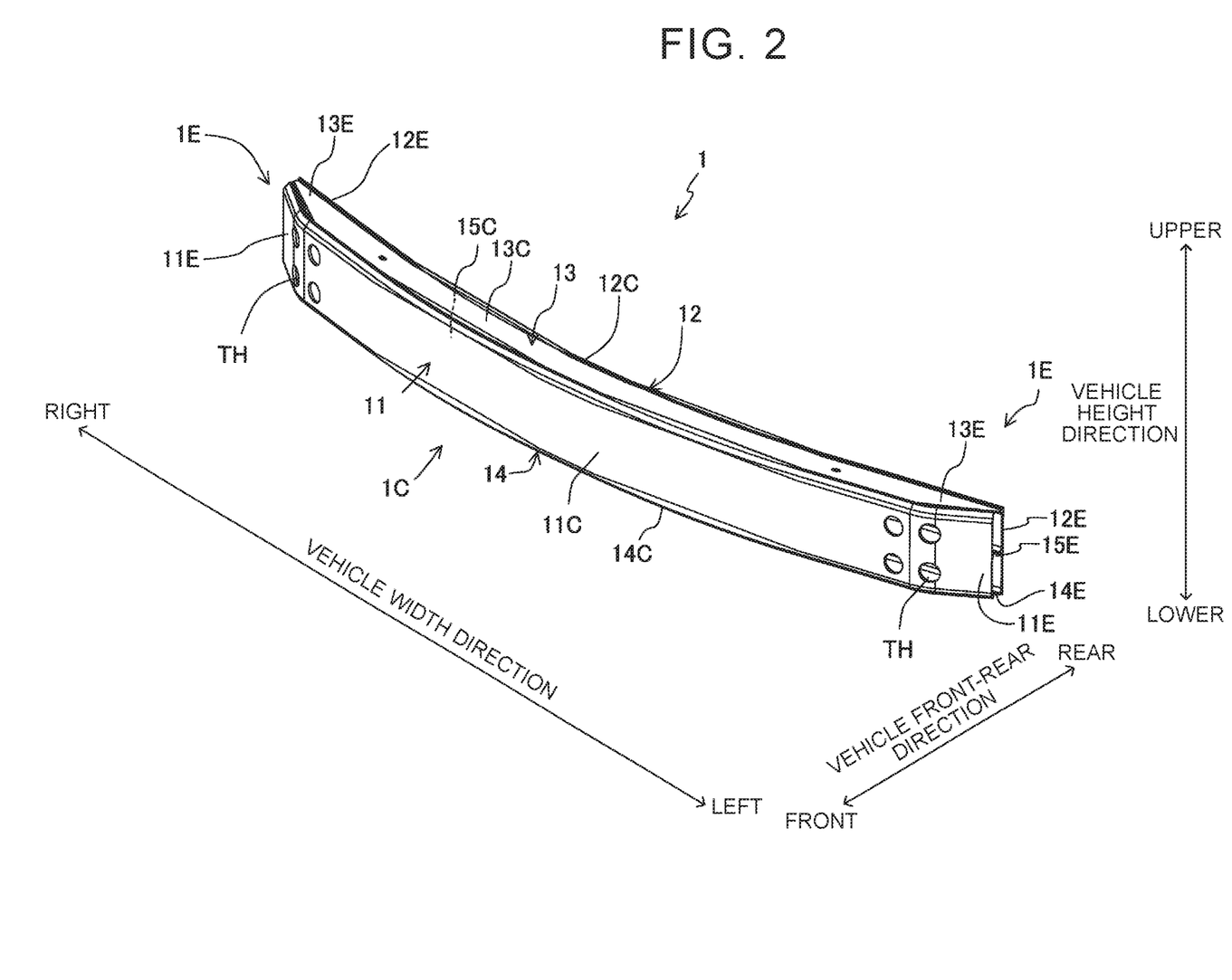
FIG. 2 is a perspective view of the bumper reinforcement viewed obliquely from a front left side.
Figure 3:
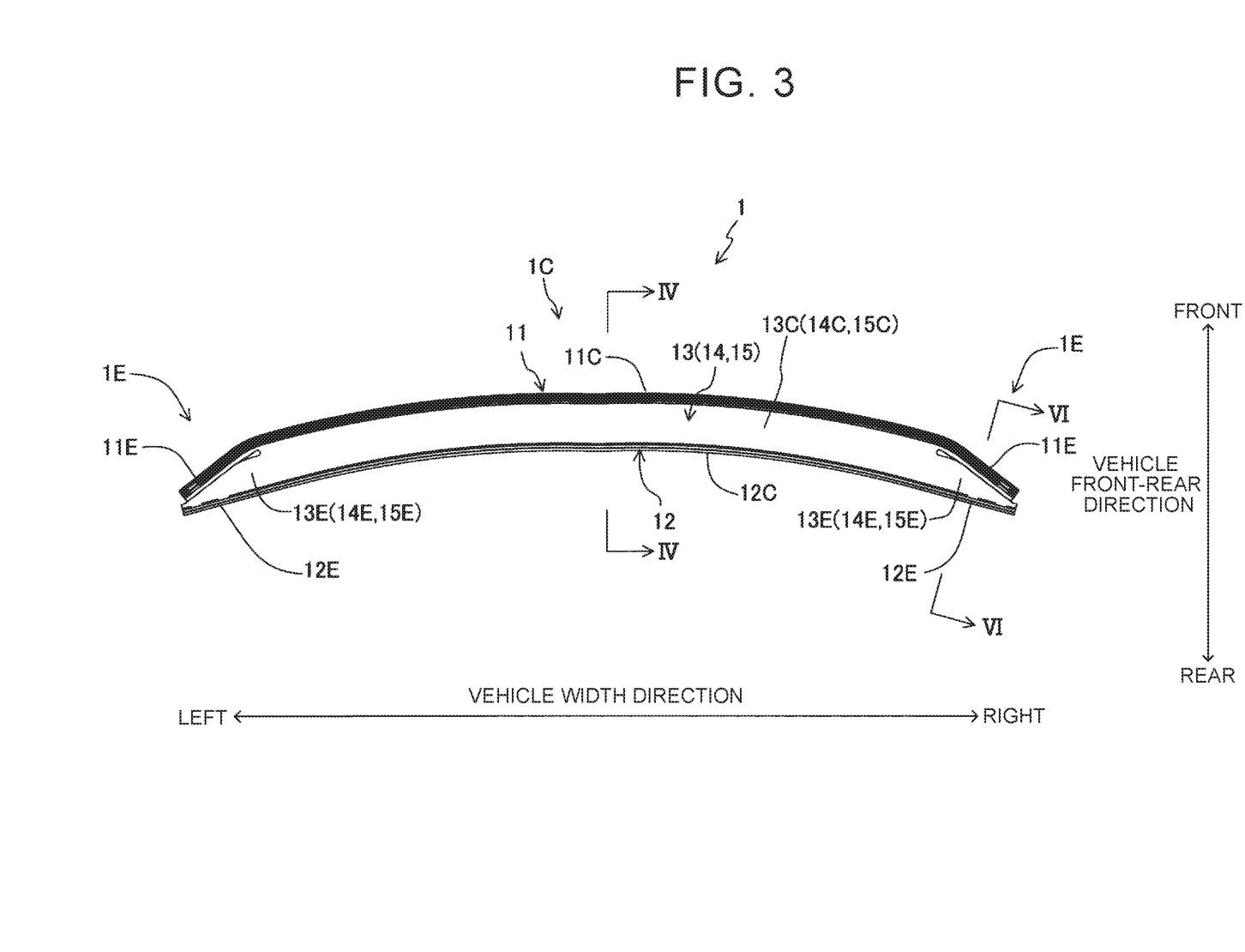
FIG. 3 is a plan view of the bumper reinforcement.
Figure 4:
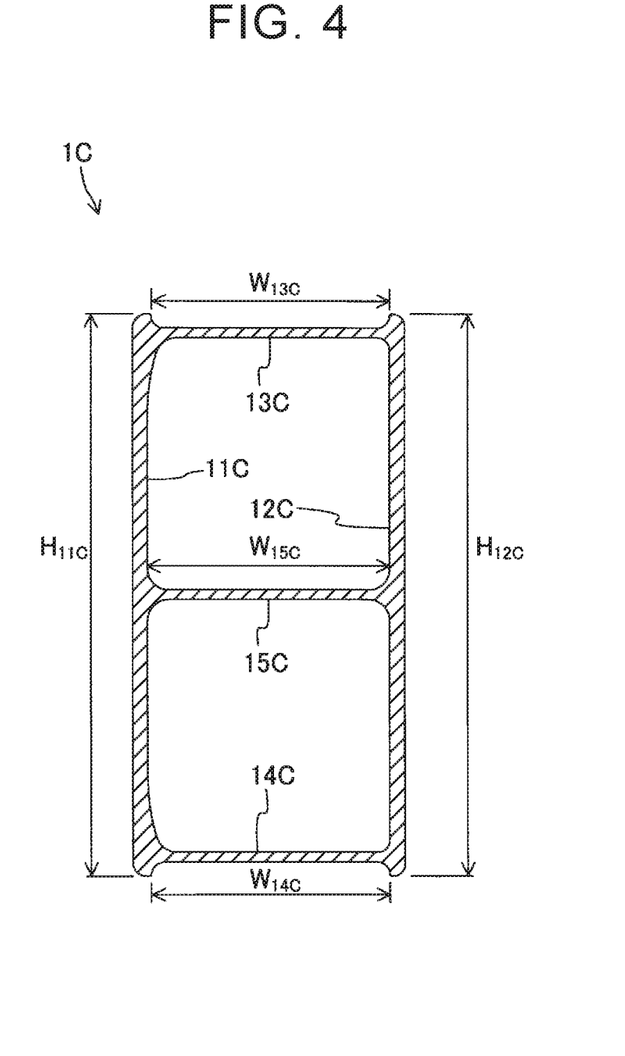
FIG. 4 is a sectional view taken along a line IV-IV in FIG. 3.

Next, a structure of the bumper reinforcement 1 is described. As illustrated in FIG. 1, the bumper reinforcement 1 has a polygonal tubular shape (rectangular tubular shape in the embodiment) that extends horizontally from a first end (the right end) of the vehicle to a second end (the left end) of the vehicle in the vehicle width direction. That is, as illustrated in FIGS. 2 to 4, the bumper reinforcement 1 includes a front wall 11, a rear wall 12, an upper wall 13, a lower wall 14, and a rib 15. Each of the front wall 11 and the rear wall 12 has a band shape extending in the vehicle width direction. A wall surface of the front wall 11 faces forward. The rear wall 12 is disposed behind the front wall 11. A wall surface of the rear wall 12 faces rearward. Each of the upper wall 13, the lower wall 14, and the rib 15 has a band shape extending in the vehicle width direction between the front wall 11 and the rear wall 12. The upper wall 13, the lower wall 14, and the rib 15 have the same shape. A wall surface of the upper wall 13 faces upward. The upper wall 13 is a connection wall that connects an upper end of the front wall 11 to an upper end of the rear wall 12. The lower wall 14 is disposed below the upper wall 13. A wall surface of the lower wall 14 faces downward. The lower wall 14 is a connection wall that connects a lower end of the front wall 11 to a lower end of the rear wall 12. The rib 15 is disposed between the upper wall 13 and the lower wall 14. The rib 15 is disposed in parallel to the upper wall 13 and the lower wall 14. The rib 15 is a connection wall that connects a central part, in the vehicle height direction, of the front wall 11 to a central part, in the vehicle height direction, of the rear wall 12.

Further, through-holes TH extending through the bumper reinforcement 1 in the vehicle front-rear direction are provided near a boundary between an intermediate portion 1C, in the extending direction, of the bumper reinforcement 1 and a right end portion 1E thereof and near a boundary between the intermediate portion 1C and a left end portion 1E (see FIG. 2). Tools and fastening members are inserted into the bumper reinforcement 1 via the through-holes TH, and thus, the fastening members are fastened to the flange portions of the side members $S_R$, $S_L$. Thus, the bumper reinforcement 1 is fixed to a vehicle body.

A shape of each portion of the bumper reinforcement 1 is set so that the bumper reinforcement 1 does not interfere with a bumper cover in a state where the bumper reinforcement 1 and the bumper cover are attached to the vehicle body. In the following description, structures of the intermediate portion 1C and the right and left end portions 1E of the bumper reinforcement 1 in the extending direction are described more specifically. In the following description, in the front wall 11, the rear wall 12, the upper wall 13, the lower wall 14, and the rib 15, parts located in the intermediate portion 1C are respectively referred to as a front wall 11C, a rear wall 12C, an upper wall 13C, a lower wall 14C, and a rib 15C. Further, in the front wall 11, the rear wall 12, the upper wall 13, the lower wall 14, and the rib 15, parts located in the end portion 1E are respectively referred to as a front wall 11E, a rear wall 12E, an upper wall 13E, a lower wall 14E, and a rib 15E.

First, a structure of the intermediate portion 1C of the bumper reinforcement 1 in the extending direction is described. As illustrated in FIG. 3, the intermediate portion 1C curves in an arch shape in a plan view. That is, a central part of the intermediate portion 1C in the extending direction is disposed in a more forward position than positions of ends of the intermediate portion 1C in the extending direction. In other words, the central part of the intermediate portion 1C in the extending direction is closer to a front portion of the vehicle than the ends of the intermediate portion 1C in the extending direction are. A sectional shape (see FIG. 4) perpendicular to the extending direction of the intermediate portion 1C (the central axis of the intermediate portion 1C) is uniform from a first end (the right end) of the intermediate portion 1C to a second end (the left end) of the intermediate portion 1C. That is, the front wall 11C is parallel to the rear wall 12C. In other words, lengths $W_{13C}$, $W_{14C}$, $W_{15C}$ of the upper wall 13C, the lower wall 14C, and the rib 15C in the width direction (a direction perpendicular to the front wall 11C or the rear wall 12C) are uniform. Further, lengths $H_{11C}$, $H_{12C}$ of the front wall 11C and the rear wall 12C in the vehicle height direction are uniform.

Figure 5:
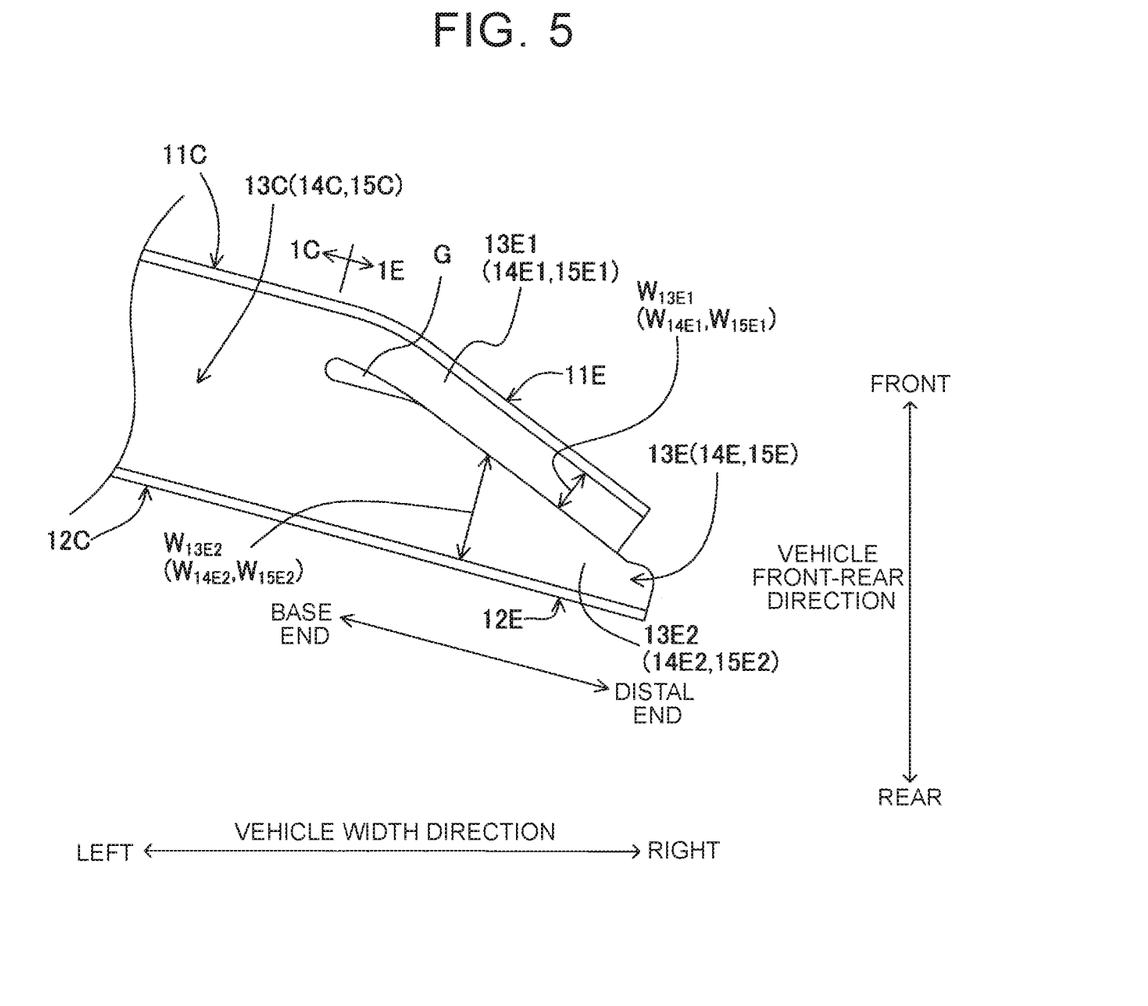
FIG. 5 is an enlarged plan view illustrating a right end portion in FIG. 3 in an enlarged manner.
Figure 6:
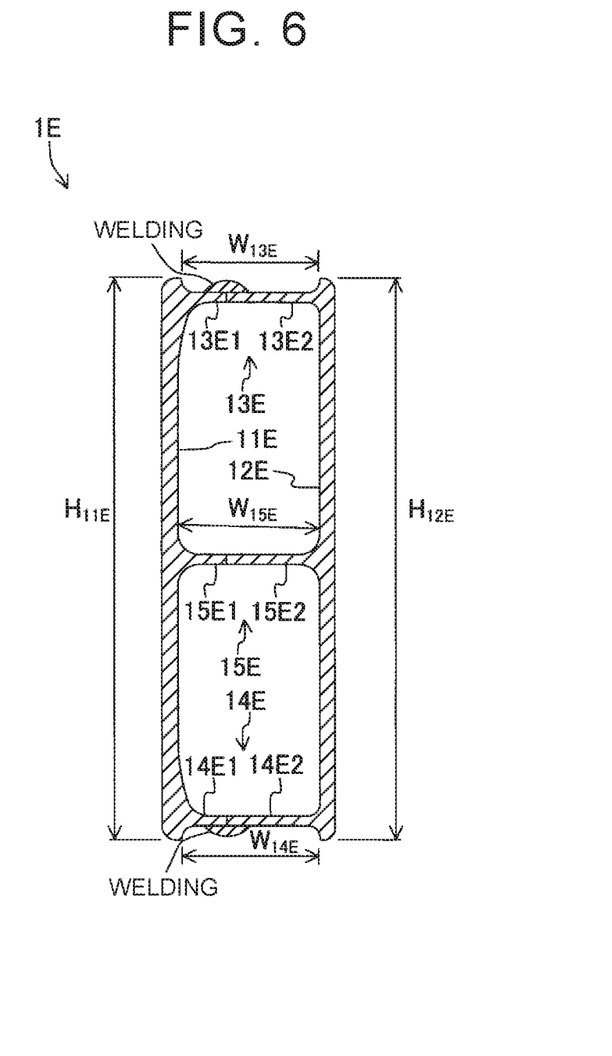
FIG. 6 is a sectional view taken along a line VI-VI in FIG. 3.

Next, structures of the end portions 1E of the bumper reinforcement 1 are described. Since the structure of the right end portion 1E is bilaterally symmetrical to the structure of the left end portion 1E, the right end portion 1E is described and the description of the left end portion 1E is omitted. The end portion 1E is provided so as to extend obliquely to the rear right side from the right end of the intermediate portion 1C (see FIGS. 3 and 5). That is, a base end of the end portion 1E (the front wall 11E, the rear wall 12E, the upper wall 13E, the lower wall 14E, and the rib 15E) is disposed at the right end of the intermediate portion 1C. A distal end of the end portion 1E (the front wall 11E, the rear wall 12E, the upper wall 13E, the lower wall 14E, and the rib 15E) is disposed at a position in a direction obliquely extending toward the rear right side when the distal end of the end portion 1E is viewed from the base end of the end portion 1E. In other words, the distal end of the end portion 1E is disposed behind and on the right side of the base end of the end portion 1E. A sectional shape of the end portion 1E perpendicular to the extending direction (the extending direction of the rear wall 12E) gradually changes from the base end of the end portion 1E to the distal end of the end portion 1E. A sectional shape of the base end of the end portion 1E is the same as the sectional shape of the intermediate portion 1C illustrated in FIG. 4. The distance between the front wall 11E and the rear wall 12E gradually decreases in a direction from the base end of the end portion 1E toward the distal end of the end portion 1E (see FIG. 6). In other words, lengths $W_{13E}$, $W_{14E}$, $W_{15E}$ of the upper wall 13E, the lower wall 14E, and the rib 15E in the width direction (a direction perpendicular to the rear wall 12E) gradually decrease. Note that lengths $H_{11E}$, $H_{12E}$ of the front wall 11E and the rear wall 12E in the vehicle height direction are uniform.

The following describes a structure of each wall of the end portion 1E more specifically. The front wall 11E bends rearward when the front wall 11E is viewed from the front wall 11C (see FIG. 5). The rear wall 12E is provided so as to linearly extend obliquely rearward from the right end of the rear wall 12C. The front wall 11E is inclined relative to the rear wall 12E. That is, the distance between a distal end of the front wall 11E and a distal end of the rear wall 12E is smaller than the distance between a base end of the front wall 11E and a base end of the rear wall 12E.

The upper wall 13E includes a front part 13E1 connected to the front wall 11E, and a rear part 13E2 connected to the rear wall 12. A length $W_{13E1}$ of the front part 13E1 in the width direction (a direction perpendicular to the front wall 11E) is uniform from a base end of the upper wall 13E to a distal end of the upper wall 13E (see FIG. 5). A length $W_{13E2}$ of the rear part 13E2 in the width direction (a direction perpendicular to the rear wall 12E) gradually decreases in a direction from the base end of the upper wall 13E toward the distal end of the upper wall 13E. The front part 13E1 is provided so as to extend along the rear part 13E2. A front end surface of the rear part 13E2 contacts a rear end surface of the front part 13E1 (i.e., the front end surface of the rear part 13E2 is in surface contact with the rear end surface of the front part 13E1). A contact portion between the front end surface of the rear part 13E2 and the rear end surface of the front part 13E1 is welded. In the base ends of the front part 13E1 and the rear part 13E2, a gap G is formed between the front part 13E1 and the rear part 13E2. As will be described later more specifically, the gap G is a remaining part of a cut portion C provided in a manufacturing process (a trimming step) for the bumper reinforcement 1.

Similarly to the upper wall 13E, the lower wall 14E includes a front part 14E1 and a rear part 14E2. Further, similarly to the upper wall 13E, a gap G is formed between base ends of the front part 14E1 and the rear part 14E2. A contact portion between the front part 14E1 and the rear part 14E2 is welded. Further, similarly to the upper wall 13E, the rib 15E includes a front part 15E1 and a rear part 15E2. Further, similarly to the upper wall 13E, a gap G is formed between base ends of the front part 15E1 and the rear part 15E2. Note that the front part 15E1 and the rear part 15E2 of the rib 15E are not welded (see FIG. 6).

Figure 7:
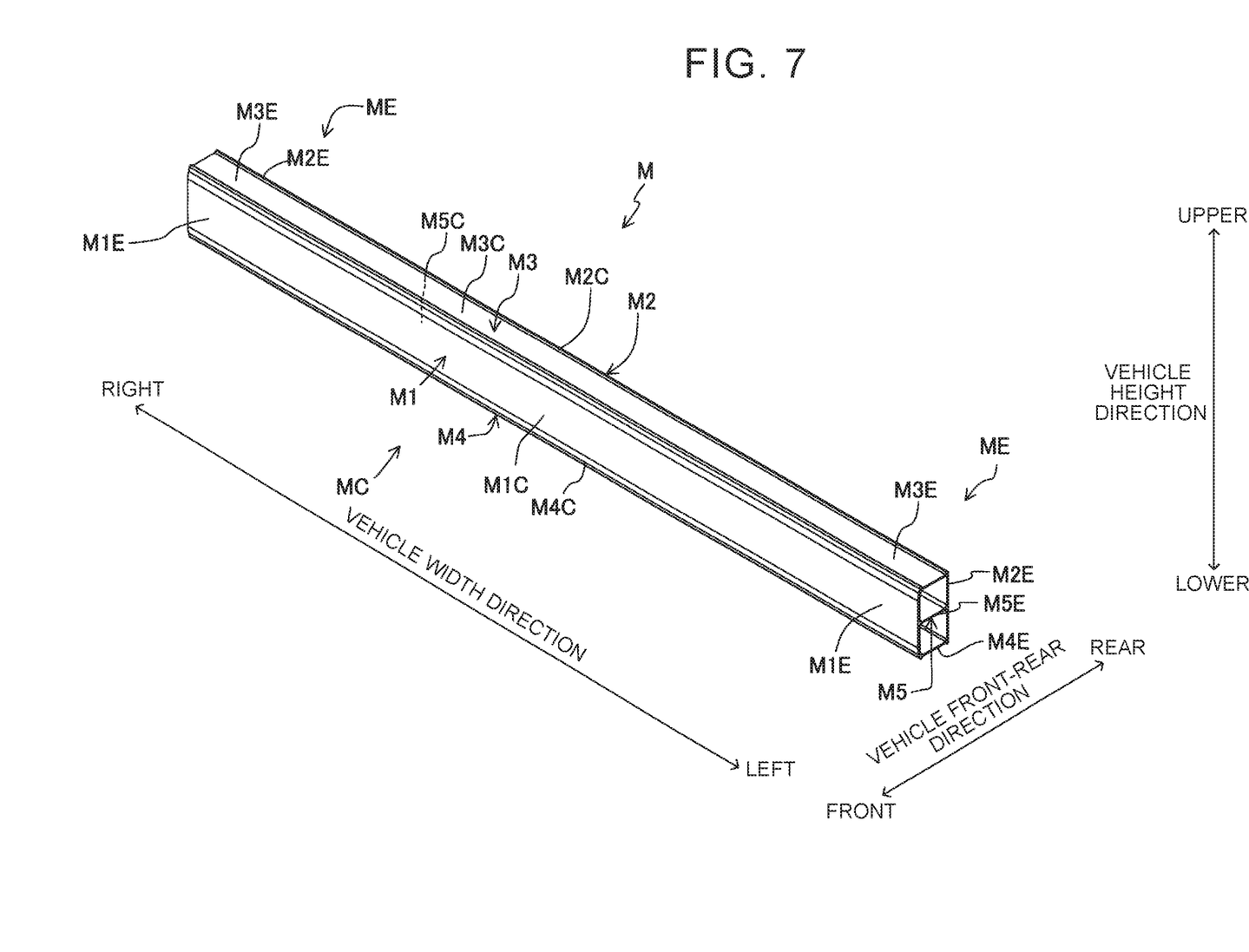
FIG. 7 is a perspective view of an intermediate formed body formed in a forming step when viewed obliquely from the front left side.

Next, a method of manufacturing the bumper reinforcement 1 will be described. First, an aluminum alloy material is extruded so that a tubular intermediate formed body M that extends linearly is manufactured (an extruding step), as illustrated in FIG. 7. The extrusion direction of the aluminum alloy material is the same as the vehicle width direction. A sectional shape of the intermediate formed body M perpendicular to its extending direction is the same as a sectional shape (see FIG. 4) of the intermediate portion 1C of the bumper reinforcement 1 as a finished product, the sectional shape of the intermediate portion 1C being perpendicular to its extending direction. That is, the intermediate formed body M includes a front wall M1, a rear wall M2, an upper wall M3, a lower wall M4, and a rib M5 corresponding to the front wall 11, the rear wall 12, the upper wall 13, the lower wall 14, and the rib 15 of the bumper reinforcement 1. Note that the extruding step corresponds to a first step of the disclosure. In the following description, in the front wall M1, the rear wall M2, the upper wall M3, the lower wall M4, and the rib M5, parts located in an intermediate portion MC of the intermediate formed body M in the extending direction are respectively referred to as a front wall M1C, a rear wall M2C, an upper wall M3C, a lower wall M4C, and a rib M5C. Further, in the front wall M1, the rear wall M2, the upper wall M3, the lower wall M4, and the rib M5, parts located in an end portion ME of the intermediate formed body M in the extending direction are respectively referred to as a front wall M1E, a rear wall M2E, an upper wall M3E, a lower wall M4E, and a rib M5E.

Figure 8:
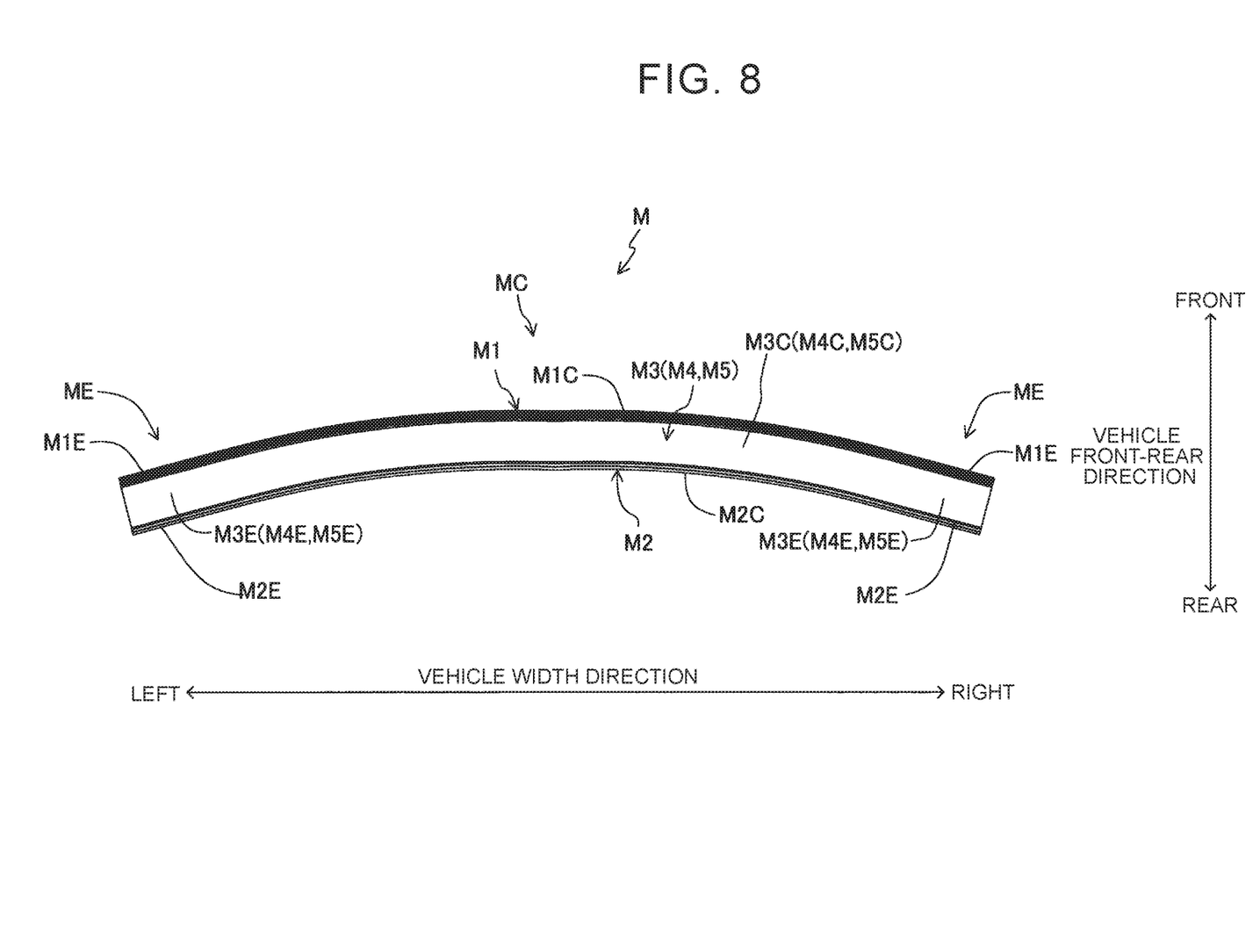
FIG. 8 is a plan view of the intermediate formed body curved in a curve forming step.

Then, as illustrated in FIG. 8, the intermediate portion MC is pressed forward relative to the end portions ME of the intermediate formed body M in the extending direction, and thus, the intermediate portion MC is formed to be curved (a curve forming step). In the curve forming step, the end portions ME are not shaped. That is, the end portions ME are maintained in a state in which the end portions ME extend linearly. The right end portion ME is provided so as to extend obliquely toward the rear right side from the right end of the intermediate portion MC. That is, a base end of the right end portion ME (the front wall M1E, the rear wall M2E, the upper wall M3E, the lower wall M4E, and the rib M5E) is disposed at the right end of the intermediate portion MC. A distal end of the right end portion ME (the front wall M1E, the rear wall M2E, the upper wall M3E, the lower wall M4E, and the rib M5E) is disposed at a position in a direction extending obliquely toward the rear right side when the distal end of the right end portion ME is viewed from the base end of the right end portion ME. In other words, the distal end of the right end portion ME is disposed behind and on the right side of the base end of the right end portion ME. The left end portion ME is bilaterally symmetrical to the right end portion ME.

Subsequently, through-holes TH extending through the intermediate portion MC in the vehicle front-rear direction are formed near a boundary between the intermediate portion MC and the right end portion ME and near a boundary between the intermediate portion MC and the left end portion ME (a hole forming step).

Figure 9:
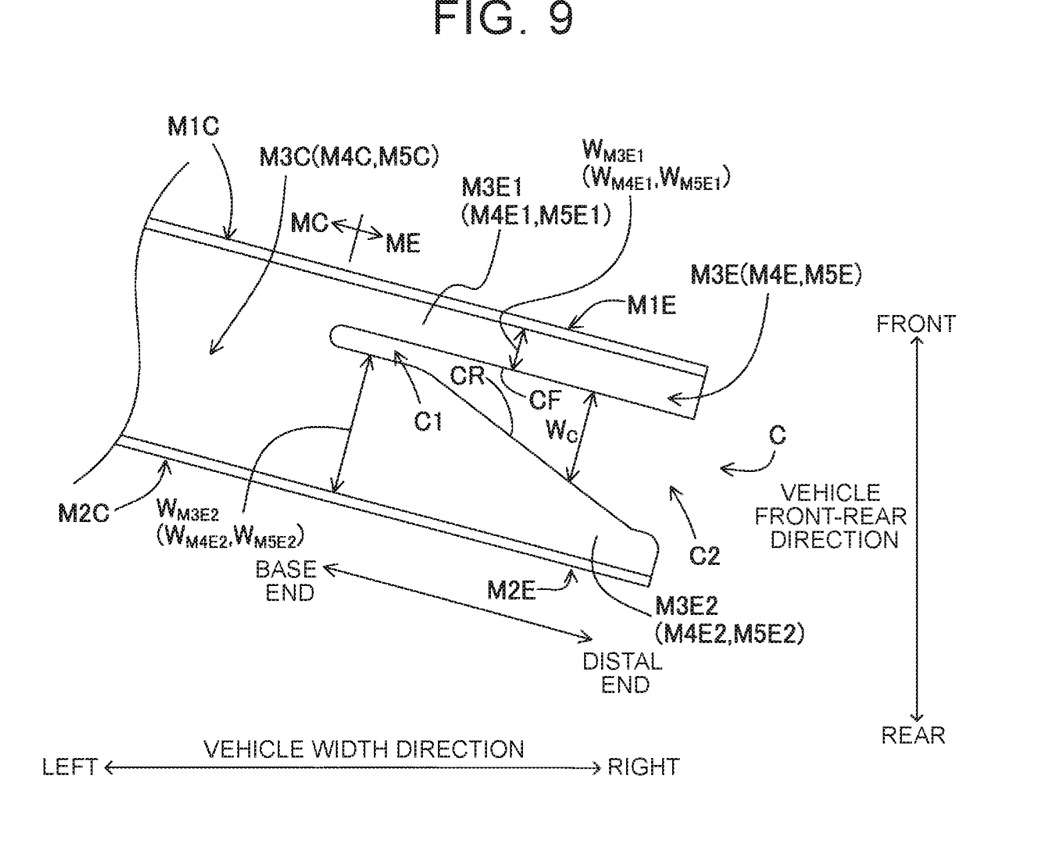
FIG. 9 is an enlarged plan view of an end portion of the intermediate formed body in which a cut portion is formed in a trimming step.

Subsequently, as illustrated in FIG. 9, an intermediate portion of the end portion ME in the width direction (a direction perpendicular to the front wall 11E or the rear wall 12E) is trimmed (a trimming step). That is, a cut portion C is formed in the end portion ME. A shape of the cut portion C of the right end portion ME is bilaterally symmetrical to a shape of the cut portion C of the left end portion ME. In view of this, the cut portion C of the right end portion ME is described, and the description on the cut portion C of the left end portion ME is omitted. Further, respective cut portions C are formed in the upper wall M3E, the lower wall M4E, and the rib M5E. The cut portions C of the upper wall M3E, the lower wall M4E, and the rib M5 have the same shape. In view of this, the cut portion C of the upper wall M3E is described, and the description on the cut portions C of the lower wall M4E and the rib M5E is omitted.

The cut portion C is formed to extend from a distal end surface of the upper wall M3E toward the base end. A length $W_C$, in the width direction, of the cut portion C gradually decreases in a direction from the distal end surface of the upper wall M3E toward the base end of the upper wall M3E. More specifically, a front side part CF (an example of a second part according to the disclosure) of the inner peripheral part of the cut portion C is parallel to the front wall M1E, the front side part CF being located on the side of the front wall M1E. A distance between the rear wall M2E and a rear side part CR (an example of a first part according to the disclosure) of the inner peripheral part of the cut portion C increases in a direction from the distal end surface of the upper wall M3E toward the base end, the rear side part CR being located on the side of the rear wall M2E. That is, the rear side part CR is inclined relative to the rear wall M2E. Note that, in the cut portion C, a base end C1 disposed at the base end of the upper wall M3E and a distal end C2 disposed at the distal end of the upper wall M3E are provided so as to extend in parallel to the extending direction of the upper wall M3E. That is, in an entire rear side part (including the rear side part CR) of the inner peripheral part of the cut portion C, the entire rear side part being located on the side of the rear wall M2E, parts located at the base end and the distal end of the upper wall 13E are parallel to the rear wall 12E.

Lengths $W_{M3E1}$, $W_{M4E1}$, $W_{M5E1}$, in the width direction, of front parts M3E1, M4E1, M5E1 in remaining parts of the upper wall M3E, the lower wall M4E, and the rib M5E are smaller than lengths $W_{M3E2}$, $W_{M4E2}$, $W_{M5E2}$, in the width direction, of base ends of rear parts M3E2, M4E2, M5E2 in the remaining parts of the upper wall M3E, the lower wall M4E, and the rib M5E, the front parts M3E1, M4E1, M5E1 being connected to the front wall M1E and the rear parts M3E2, M4E2, M5E2 being connected to the rear wall M2E. The remaining parts of the upper wall M3E, the lower wall M4E, and the rib M5E are parts remaining after the cut portions C are formed in the upper wall M3E, the lower wall M4E, and the rib M5E. Note that the trimming step corresponds to a second step of the disclosure.

Figure 10:
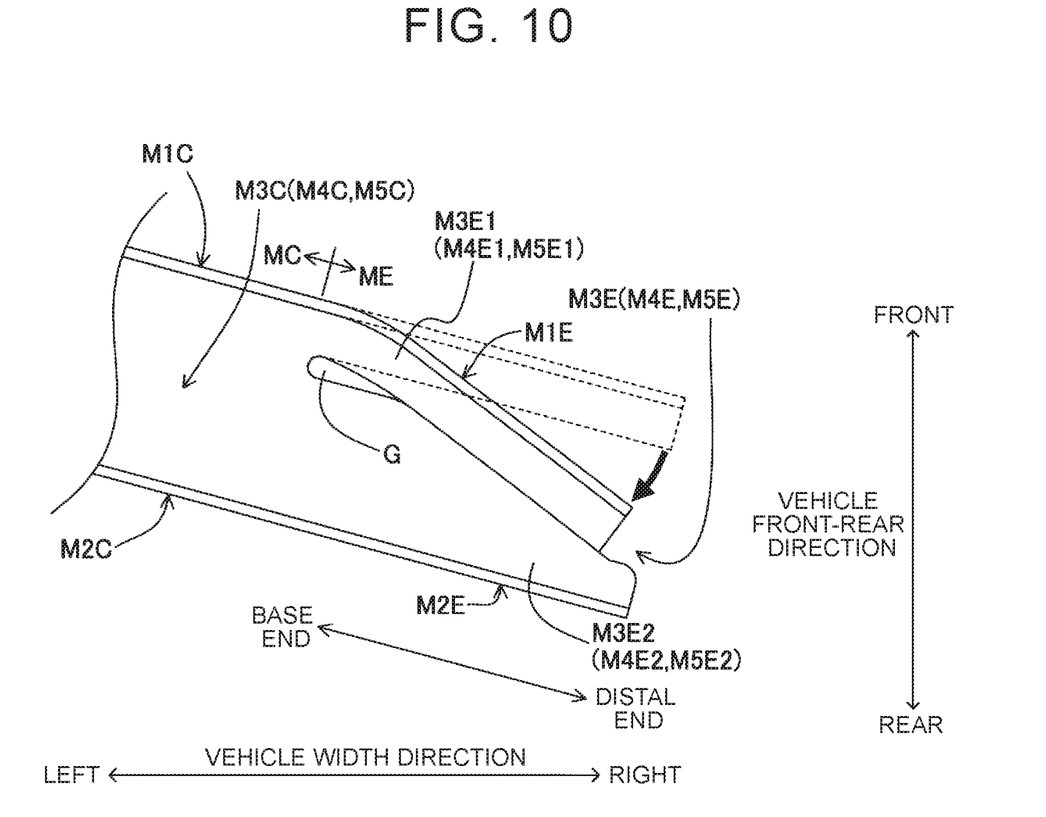
FIG. 10 is a plan view of the intermediate formed body in which a front wall of the end portion is bent in a bending step.

Subsequently, as illustrated in FIG. 10, in the end portion ME, a part located in front of the cut portion C is pressed to be bent toward the rear wall M2E (a bending step). In the present embodiment, mainly, a base end of the front wall M1E and base ends of the front parts M3E1, M4E1, M5E1 connected to the front wall M1E are bent. Thus, the front side part CF of the inner peripheral part of the cut portion C is brought into surface contact with the rear side part CR of the inner peripheral part of the cut portion C. The base end C1 of the cut portion C remains as a gap G. Note that the bending step corresponds to a third step of the disclosure. Finally, the rear side part CR and the front side part CF in each of the upper wall M3E and the lower wall M4E are welded (a welding step). Note that the rear side part CR and the front side part CF of the rib M5E are not welded.

As described above, in the present embodiment, the cut portion C is formed in the end portion ME of the intermediate formed body in the trimming step, and the part located in front of the cut portion C is bent toward the rear wall in the bending step. That is, unlike JP 2015-58759 A, in the present embodiment, the upper wall M3E, the lower wall M4E, and the rib M5E are not folded (not buckled). Accordingly, although the end portion ME is not softened by heating before the bending step, a part located in front of the cut portion C can be relatively easily bent. In the present embodiment, the lengths $W_{M3E1}$, $W_{M4E1}$, $W_{M5E1}$, in the width direction, of the front parts M3E1, M4E1, M5E1 are relatively small. Therefore, the part located in front of the cut portion C is easily bent. That is, in the present embodiment, the heating step performed in JP 2015-58759 A is not required. Further, it is possible to reduce the number of components in comparison with a bumper reinforcement manufactured by attaching a cover member to an intermediate formed body. Further, the step of attaching the cover member is not required. Thus, in the present embodiment, the manufacturing process is simplified and the component cost can be reduced. Accordingly, the bumper reinforcement 1 can be provided at low cost.

Further, in the present embodiment, in the bending step, mainly, the base end of the front wall M1E and the base ends of the front parts M3E1, M4E1, M5E1 connected to the front wall M1E are bent. In general, when a metal material is bent, it is difficult to set a curvature radius of the bent portion to "0." In the present embodiment, the base end of the front wall M1E and the base ends of the front parts M3E1, M4E1, M5E1 thus subjected to the bending step are curved. If the base end C1 of the cut portion C is not provided and the rear side part CR and the front side part CF of the inner peripheral part of the cut portion C obliquely intersect with each other as illustrated in FIG. 11, it is difficult to bring the rear side part CR and the front side part CF into surface contact with each other in the bending step, due to the curve of the base end. In the present embodiment, the base end C1 of the cut portion C is provided so as to extend in parallel to the extending direction of the upper wall M3E. When the base end of the front wall M1E and the base ends of the front parts M3E1, M4E1, M5E1 are curved such that the base ends of the front parts M3E1, M4E1, M5E1 slightly enter the base end C1 of the cut portion C in the bending step, the front side part CF and the rear side part CR provided to extend linearly are easily brought into surface contact with each other.

Further, in JP 2015-58759 A, as described above, the upper wall, the lower wall, and the rib in the end portion of the bumper reinforcement are folded (buckled). Accordingly, even if a tool and a fastening member for fixing the bumper reinforcement to the vehicle body are inserted into the end portion of the bumper reinforcement, folded parts of the upper wall, the lower wall, and the rib serve as obstacles, and thus, it is difficult to perform an operation of fastening the bumper reinforcement to the frame member. In contrast, in the present embodiment, since the upper wall M3E, the lower wall M4E, and the rib M5E are not folded (not buckled), it is possible to easily fix the bumper reinforcement 1 to the vehicle body.

Further, the disclosure is not limited to the above embodiment, and various modifications can be made without departing from the scope of the disclosure.

Figure 12:
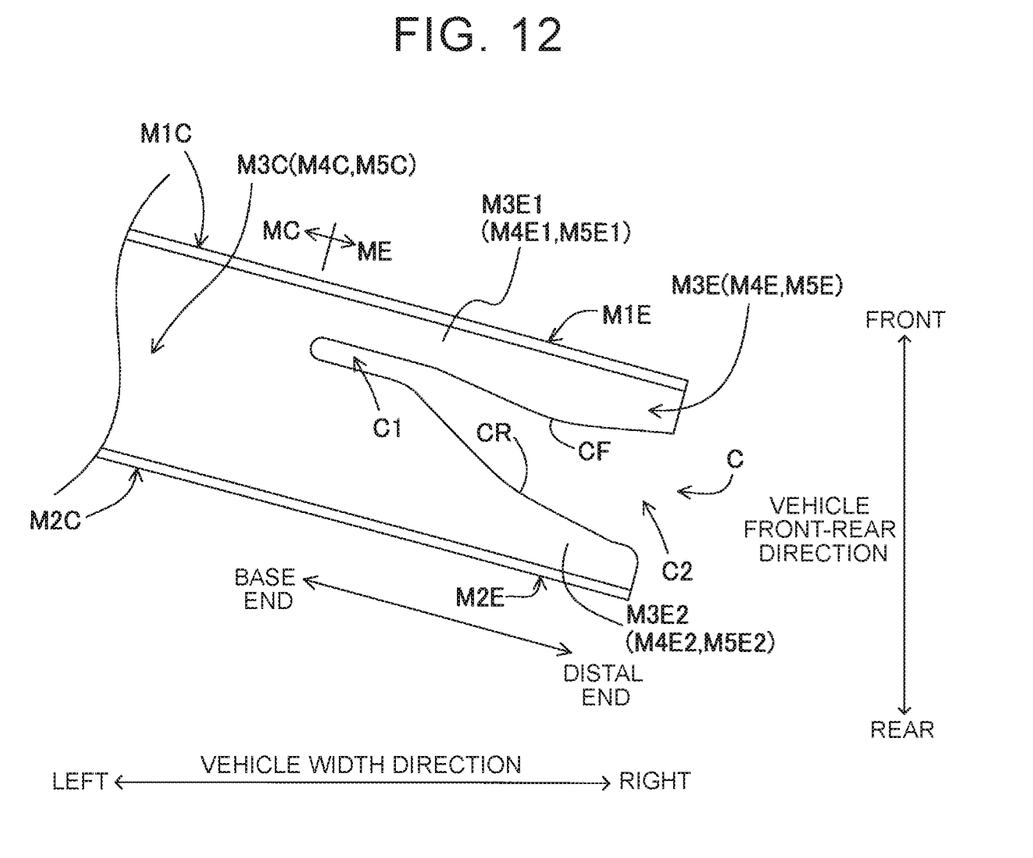
FIG. 12 is a plan view of an end portion of an intermediate formed body according to another modified example of the disclosure.

For example, in the above embodiment, the front side part CF of the inner peripheral part of the cut portion C is parallel to the front wall M1E. The rear side part CR of the inner peripheral part of the cut portion C is inclined relative to the rear wall M2E. Instead of employing this structure, the front side part CF and the rear side part CR may be slightly curved as illustrated in FIG. 12. In this case, shapes of the front side part CF and the rear side part CR may be set to correspond to each other so that the front side part CF and the rear side part CR contact each other (make surface contact with each other) at the time when the part located in front of the cut portion C is bent in the bending step. Note that the front side part CF and the rear side part CR may be set such that a part of the front side part CF and a part of the rear side part CR contact each other (are brought into surface contact or point contact with each other).

What is claimed is:

1. A method of manufacturing a bumper reinforcement, the method comprising:
   integrally forming an intermediate formed body such that a sectional shape perpendicular to an extending direction of the intermediate formed body is uniform from a first end to a second end in the extending direction, wherein the intermediate formed body includes
   a front wall provided as a band-shaped wall so as to extend in a vehicle width direction in a front end portion of a vehicle, the front wall having a wall surface facing forward,
   a rear wall provided as a band-shaped wall so as to extend in the vehicle width direction behind the front wall, the rear wall having a wall surface facing rearward, and
   a connection wall provided as a band-shaped wall so as to extend in the vehicle width direction between the front wall and the rear wall, the connection wall having a wall surface facing upward or downward, and the connection wall being configured to connect the front wall to the rear wall;
   forming a cut portion such that the cut portion extends from a distal end surface of an end portion, in the extending direction, of the connection wall toward a base end of the end portion, and a distance between the rear wall and a first part of an inner peripheral part of the cut portion increases in a direction from the distal end surface of the end portion toward the base end, the first part of the inner peripheral part being located on a side of the rear wall; and
   bending a part of the end portion toward the rear wall, the part of the end portion being located in front of the cut portion, wherein:
   the first part of the inner peripheral part of the cut portion is curved, and
   a second part of the inner peripheral part of the cut portion is curved, the second part being located on a side of the front wall.

2. The method according to claim 1, wherein:
   the second part of the inner peripheral part of the cut portion is parallel to the front wall; and
   the first part of the inner peripheral part of the cut portion is inclined relative to the rear wall.

3. The method according to claim 2, wherein a part of the cut portion is provided so as to extend in parallel to the extending direction of the end portion, the part of the cut portion being located at the base end of the end portion.

4. The method according to claim 1, wherein a part of the cut portion is provided so as to extend in parallel to the extending direction of the end portion, the part of the cut portion being located at the base end of the end portion.

* * * * *